R. V. HASTINGS.
TIRE PROTECTOR.
APPLICATION FILED MAR. 8, 1911.

1,019,468.

Patented Mar. 5, 1912.

2 SHEETS—SHEET 1.

Witnesses:
C. E. Wessels.
A. A. Olson.

Inventor:
Ralph V. Hastings.
By Joshua R. H. Potts
his Attorney.

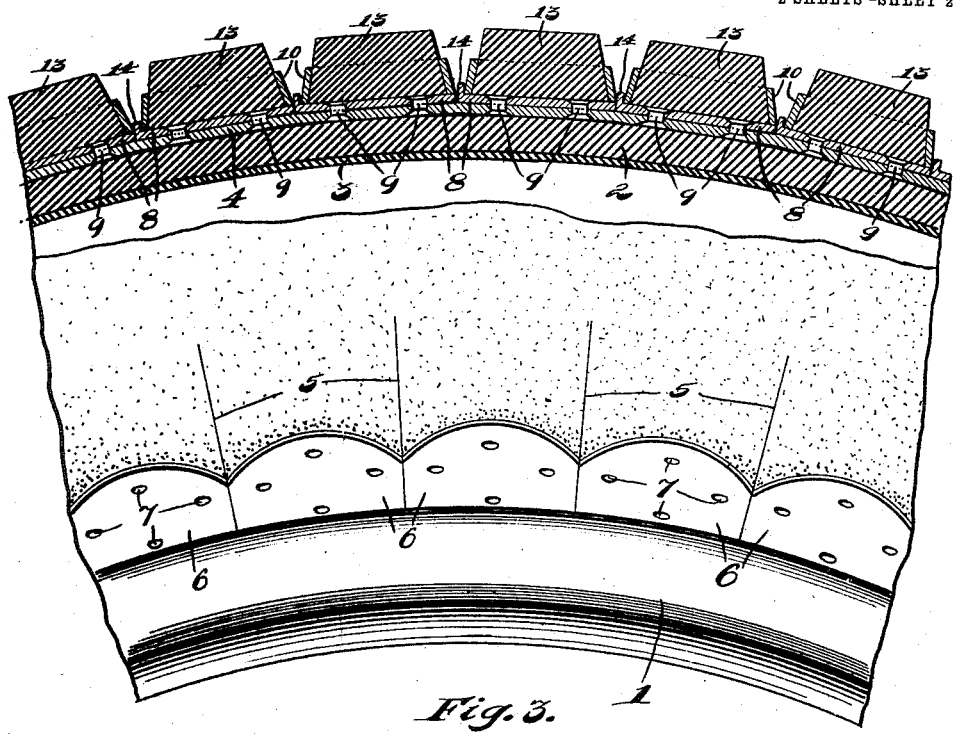
Fig. 3.
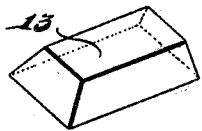 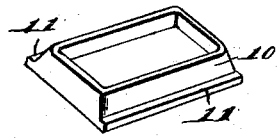 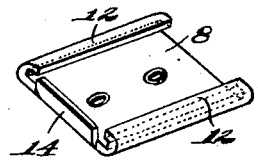
Fig. 4.  Fig. 5.  Fig. 6.
Fig. 7.

UNITED STATES PATENT OFFICE.

RALPH V. HASTINGS, OF CHICAGO, ILLINOIS.

TIRE-PROTECTOR.

1,019,468.  Specification of Letters Patent.  Patented Mar. 5, 1912.

Application filed March 8, 1911. Serial No. 613,141.

*To all whom it may concern:*

Be it known that I, RALPH V. HASTINGS, a citizen of the United States, residing at Chicago, county of Cook, and State of Illinois, have invented certain new and useful Improvements in Tire-Protectors, of which the following is a specification.

My invention relates to improvements in protectors for pneumatic tires and has for its object the production of a device of this character which will be of improved construction and of great efficiency in operation.

Other objects will appear hereinafter.

With these objects in view my invention consists in a tire protector of the construction hereinafter described and claimed.

Figure 2:
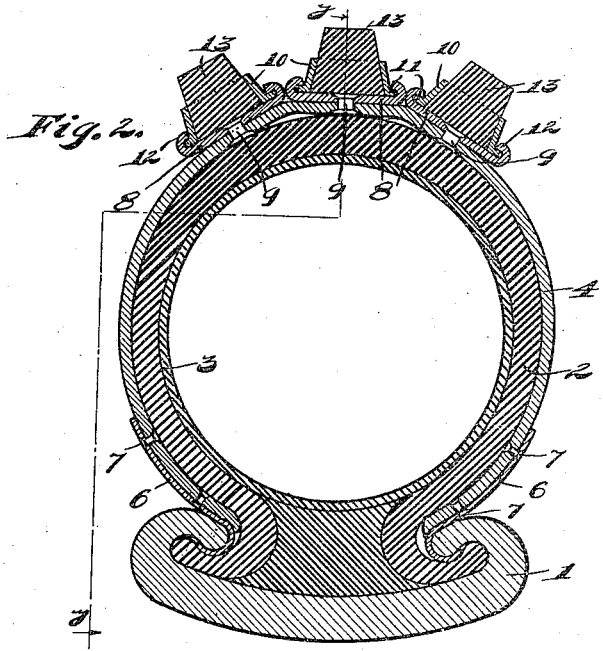
Figure 1:
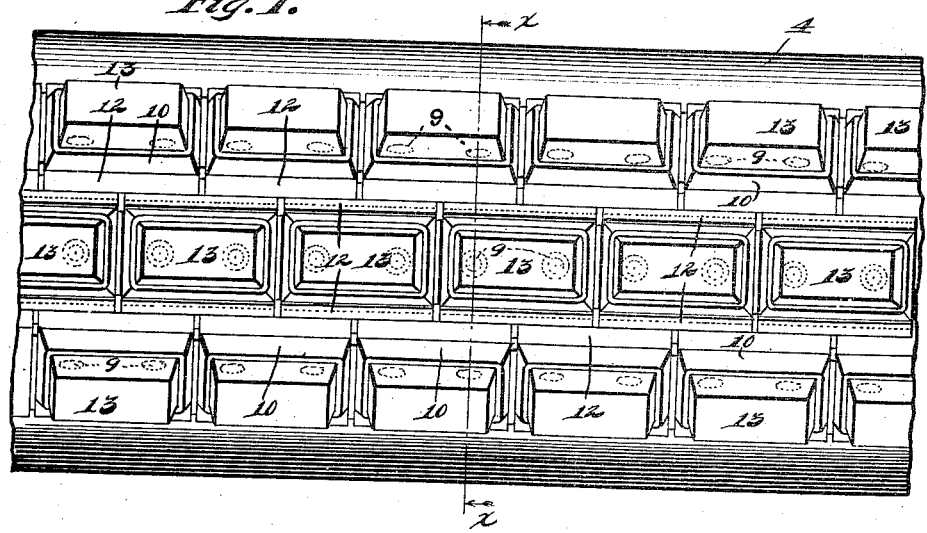

My invention will be more readily understood by reference to the accompanying drawings forming a part of this specification, and in which, Figure 1 is a top plan view of a fragment of a pneumatic tire to which is applied a protector embodying my invention, Fig. 2 is a transverse section taken on line $x$—$x$ of Fig. 1, Fig. 3 is a longitudinal section taken substantially on line $y$—$y$ of Fig. 2, Fig. 4 is a perspective view of one of the tread blocks included in the construction, Fig. 5 is a perspective view of one of the tread block holders, detached, Fig. 6 is a perspective view of one of the base members which are arranged upon the body of the protector and with which the holders, one of which is shown in Fig. 5, slidably engage, and Fig. 7 is a transverse section of a slightly modified form of tread block.

Referring now to the drawings 1 designates a conventional vehicle wheel rim in which is mounted the tire casing 2 and the air tube 3 arranged within the casing 2 in the ordinary manner. Arranged upon the tread portion of the tire, that is of the casing 2, is the flexible body 4 of the protector constituting the subject matter of this invention. The body 4 is formed of a single sheet of any suitable flexible durable material, leather or the like being preferably employed. In order that said body 4 will be adapted to snugly embrace the tire, the respective longitudinal edges thereof are slit and cut away as at 5 so that when the body member 4 is arranged upon the tire, the edges of said slits will be disposed in close proximity, as clearly shown in Fig. 3, to completely cover the tire upon which it is arranged. The body member 4 is held in the operative position upon the tire through the medium of hooked engaging members 6 which are secured to the longitudinal edges of said body preferably by means of rivets 7, the outer hooked end portions of said members 6 engaging the engaging flanges of the rim 1 in the manner clearly illustrated in Fig. 2. In use, the body member 4 is arranged upon the tire when the latter is in deflated condition. Upon said body being arranged in position the tire is inflated, the arrangement being such that when said tire is fully distended the protector body 4 will be tightly stretched around the tread portion of the tire.

Arranged centrally upon the outer side of the member 4 are tread projections which, in operation, serve to bear the bulk of the wear upon the tire and also to prevent slipping. Each of said projections comprises a channel-formed base member 8 which is rigidly and permanently secured to the member 4 by means of rivets 9. The members 8 are arranged upon the member 1 preferably in three circumferentially extending rows, those in each row being arranged end to end, as clearly shown in Fig. 1, the members of adjacent rows being in staggered relation as clearly shown in said figure. The rivets 9 of adjacent base members 8 in adjacent rows are arranged in transverse alinement as clearly shown in Figs. 1 and 2 so that transverse bending of the body member 4 at each side of transversely alining rivets is permitted, this being of special advantage as will be hereinafter described.

Detachably mounted in each of the members 8 is a frusto-pyramidal tread block holder 10, the longitudinal edges of each of the members 10 being provided with projecting flanges 11 which slidably engage under the engaging flanges 12 provided at the longitudinal edges of said base members 8. Carried in each of the holders 10 is a resilient tread block 13 of a form corresponding with that of the former, the arrangement being such that said blocks will be firmly held against outward movement in the holders 10 but will be free for removal from said holders when the latter are disengaged from the base members 8. The members 13 are formed of any suitable resilient material, rubber being preferably employed since the latter because of its non-abrasiveness being adapted to outwear any other material now known which could be used for this purpose. Longitudinal movement of the holders 10 in the base members 8 in one direction is prevented by outwardly projecting flanges 14 formed at corresponding extremities of said base members, the arrangement being such that movement of each holder in the opposite direction will be prevented by reason of the flanged extremity of the adjacent base member 8 being disposed to prevent such movement, as clearly shown in Fig. 3. Removal of the holders 10 may be effected by bending the body member 4 in the line of the transversely alined rivets 9, since by so doing the ends of the base members 8 will be turned so that the members 10 may be slid to disengagement.

If desired, the members 10 may be dispensed with and a flange formed integral on the block as shown in Fig. 7, the member 15 thus formed being adapted to be slid into engagement with the engaging flanges of the members 8 in the same manner as the holders 10.

A tire protector of the construction set forth is durable and economical. When the tread blocks 13 become worn the same may be readily renewed and new ones arranged in their places, or if said blocks are worn to such an extent that the holders 10 are also worn down, both holder and block may be renewed by simply detaching the body member 4 and bending the same in the manner above described.

It is understood that the arrangement of the tread devices or projections carried by the body member 4 may be changed if desired without departing from the spirit of the invention, it being only important that if the arrangement is altered that adjacent projections will serve as means of locking each other in position and that the rivets securing the base members 8 will be so disposed as to permit of the body member 4 being bent so as to permit of detachment of the holders 10.

While I have illustrated and described the preferred form of construction for carrying my invention into effect this is capable of variation and modification without departing from the spirit of the invention. I, therefore, do not wish to be limited to the precise details of construction set forth but desire to avail myself of such variations and modifications as come within the scope of the appended claims.

Having described my invention what I claim as new and desire to secure by Letters Patent is:

1. A tire protector comprising a flexible body adapted to embrace the tread portion of a tire; resilient pyramidal tread blocks arranged in close proximity with each other upon the outer side of said body; and means for detachably securing said blocks in position upon said body, said means comprising holders for said blocks detachably engaging the latter; and channel-formed base members permanently secured to said body, said block holders slidably and detachably engaging said base members, corresponding ends of said base members being closed to prevent movement of said block holders in one direction, said base members being so arranged that each serves as a means of normally preventing movement of the next adjacent holder in the opposite direction, substantially as described.

2. A tire protector comprising a flexible body adapted for securing upon a tire to embrace the tread portion thereof; resilient rubber pyramidal tread blocks arranged upon the outer side of said body in rows extending longitudinally about the latter; and means for detachably securing said blocks in position upon said body, said means comprising pyramidal holders for said blocks detachably engaging the latter; and channel-formed base members permanently secured to said body, the longitudinal base of said block holders slidably and detachably engaging said base members, corresponding ends of said base members being closed to prevent movement of said block holders in one direction, said base members being arranged end to end so that each serve as a means for normally preventing movement of the next adjacent holder in the opposite direction, substantially as described.

3. A device of the class described comprising a tire; base blocks secured to the periphery of the tire, each of said base blocks being provided at its longitudinal edges with inwardly turned securing flanges and at one end with an upwardly turned stop flange; outwardly tapering holders having side flanges engaging said securing flanges; and outwardly tapering tread blocks fitting within said holders, substantially as described.

In testimony whereof I have signed my name to this specification in the presence of two subscribing witnesses.

RALPH V. HASTINGS.

Witnesses:
JOSHUA R. H. POTTS,
W. C. SMITH.